April 29, 1941.    H. V. CRAWFORD    2,240,207
PROTECTIVE SYSTEM
Filed Dec. 30, 1939
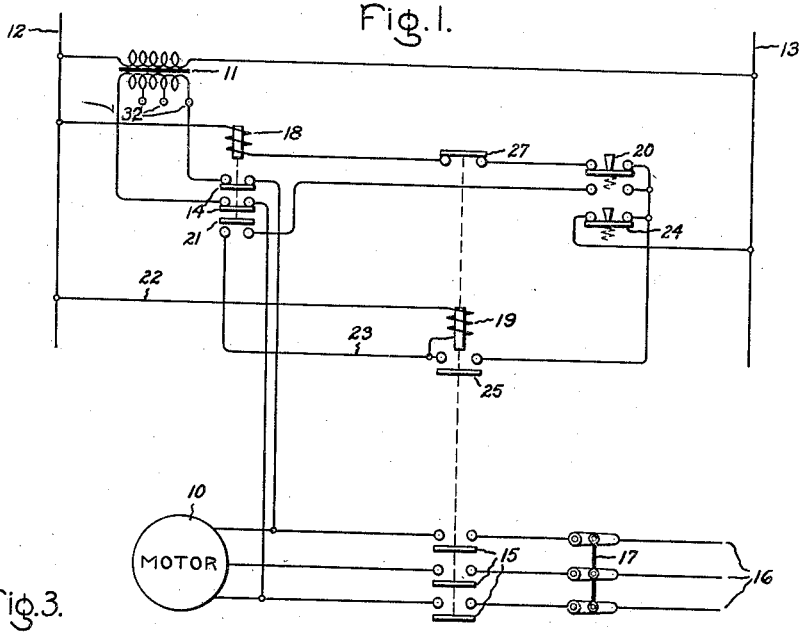
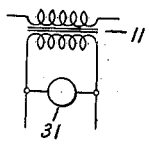
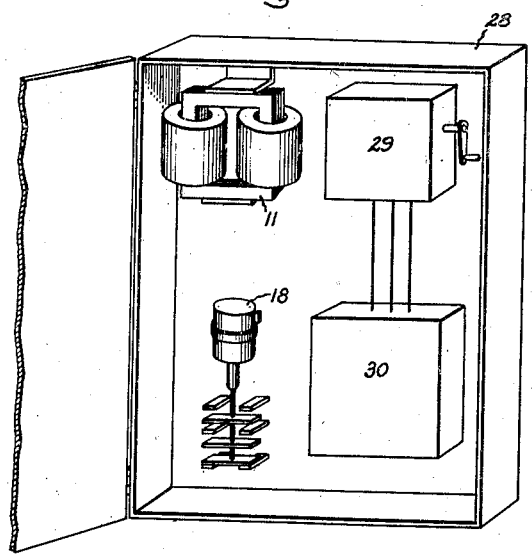
Inventor:
Henry V. Crawford,
by Harry E. Dunham
His Attorney.

Patented Apr. 29, 1941

2,240,207

UNITED STATES PATENT OFFICE 2,240,207

PROTECTIVE SYSTEM

Henry V. Crawford, Schenectady, N. Y., assignor to General Electric Company, a corporation of New York Application December 30, 1939, Serial No. 311,785

9 Claims. (Cl. 171—97)

My invention relates to protective systems for electrical apparatus and has for its object an electric heating system for maintaining electric apparatus at a temperature above the ambient temperature thereby to prevent deposits of moisture from the air on the apparatus.

In carrying out my invention in one form, I provide an auxiliary low voltage heating transformer for supplying heating current to a circuit of the electric apparatus, for example, an electric motor, so as to heat the apparatus, together with interlocking switching means for connecting the heating transformer to the apparatus when the apparatus is deenergized and for disconnecting the heating means when the apparatus is energized for operation. I also mount the transformer in an enclosed casing with other parts of the control apparatus whereby the transformer which is continuously energized maintains a temperature in the casing by reason of its heat losses above the outside ambient temperature.

For a more complete understanding of my invention, reference should be had to the accompanying drawing, Fig. 1 of which is a diagram of connections of a protective heating system for an electric motor embodying my invention; Fig. 2 is a simplified view showing the heating transformer mounted in an enclosed casing with other parts of the apparatus; while Fig. 3 is a fragmentary diagram of connections showing a modified form of my invention.

Referring to Fig. 1 of the drawing, in one form of my invention as applied to an electric motor 10, shown as a three-phase motor, I provide an auxiliary transformer 11 having its primary winding connected to alternating current supply mains 12 and 13. Its secondary winding can be connected through a normally open switch 14 to the terminals of the motor, as shown to two terminals, so as to supply a relatively low voltage heating current of a predetermined value to the motor winding when the motor is deenergized. If desired, the secondary winding can be connected to all three terminals of the motor so as to heat the entire motor winding. For motoring operation, the motor can be connected through a normally open switch 15 to three-phase supply mains 16 of suitable voltage.

This system is especially applicable to stations such as sewage pumping stations in which the apparatus is exposed to corrosive and otherwise injurious gases from which chemically contaminated deposits of moisture are made on the apparatus when the ambient temperature becomes higher than the apparatus. It will be understood that in such stations the electric apparatus often is idle for substantial lengths of time. Changes in ambient temperature to a temperature higher than the temperature of electric apparatus result in deposits of moisture on the apparatus.

Such stations are, furthermore, supplied ordinarily with suitable higher voltage current through a separate transformer whose secondary windings supply voltage to the mains 16 for the pumping motor 10. Also such stations normally have a low voltage lighting circuit separate from the energy supply circuit for the motor, and it is contemplated that the supply conductors 12 and 13 are electric light supply mains of a suitable low lighting circuit voltage. These supply mains are, of course, continuously energized whereas when the motor is not needed for long intervals, the motor supply circuit may be interrupted by opening the manually operated disconnecting switches 17.

The heating switch 14 operated by coil 18 is suitably interlocked with the motor switch 15 operated by coil 19 so that only one is closed at any one time. As shown, the coil 19 is deenergized so that the switch 15 is open while the coil 18 is energized to maintain the switch 14 closed and supply heating current to the motor windings. To start the motor 10, the normally closed push button switch 20 is depressed whereby the circuit through its upper pair of contacts and the coil 18 is opened. The switch 14 thereupon drops open and at the same time closes an interlock switch 21 in the circuit of the coil 19. This circuit for the coil 19 leads from the supply main 12 through the conductor 22, the coil 19, the conductor 23, the switch 21, the lower pair of contacts of the push button 20, which is depressed to close a circuit between them, and through the normally closed push button 24 to the supply main 13. The coil 19 thereupon picks up and closes the switch 15 to start the motor. At the same time, the coil 19 closes an interlock switch 25 which establishes a holding circuit independent of the push button 20 for the coil 19, this circuit leading from the coil 19 through the switch 25, the conductor 26, and the push button 24 to the supply main 13. Also the coil 19 opens an interlock switch 27 which maintains opened the circuit of the coil 18 when the push button 20 recloses a circuit through its upper pair of contacts in accordance with its bias when released.

When the motor is to be stopped, the push button 24 is depressed to open its circuit and deenergize the coil 19. The switches 15 and 25 drop open and the switch 27 is closed to establish a circuit for the coil 18. This circuit leads from the supply main 12 through the coil 18, the switch 27, the push button 20, the switch 24 which recloses when released, to the supply main 13. The coil 18 thereupon closes the switch 14 to reconnect the secondary of the transformer 11 to the motor windings and opens the switch 21, as seen in the drawing.

As shown in Fig. 2, the transformer 11 is preferably mounted in a substantially air-tight metal casing or box 28 together with the other electrical apparatus including the disconnecting switch 17 mounted in an enclosing metal casing 29, and the switches or contactors 15, switches 25 and 27 and the coil 19 mounted in a metal enclosing casing 30. Also mounted in the box 28 is the relay including the coil 18 and its switches 14 and 21. This box 28 is kept closed and the heat generated by the transformer 11, independently of any heat which may be produced by the coils 18 or 19, by reason of its core losses alone heats the interior of the box slightly above the outside ambient temperature whereby deposits of moisture on the apparatus in the box is prevented, the apparatus in the box being maintained at a temperature above the outside ambient temperature. It will be understood that at all times the magnetizing current in the transformer and the energy loss in the magnetic core generates a predetermined amount of heat when the secondary circuit of the transformer is open. When the secondary circuit is closed, a greater amount of heat is generated. Also, of course, the coils 18 or 19 when energized produce a certain amount of heat which still further raises the box temperature.

In the event that the heat generated by the transformer 11 is not sufficient to heat the box 28 a suitable auxiliary heating resistor may be mounted in the box and connected across the secondary of the transformer. As shown in Fig. 3, an electric lamp 31, mounted in the box is connected across the secondary of the transformer 11 for the purpose of supplying more heat to the box interior.

I have found that a small temperature rise over the ambient temperature of one or a few degrees is ordinarily sufficient. This temperature rise will, of course, be varied to suit the atmospheric conditions. Preferably taps 32 are provided on the secondary of the heating transformer 11 whereby a selected one of several voltages may be applied to the windings of the motor to give the desired heat generation in the motor windings and the desired temperature of the parts of the motor.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. The combination with an electric energy translating device, of conductor means for supplying operating current for said device, switching means for connecting said conductor means to said device, a second conductor means for supplying a relatively small heating current for said device of a value insufficient to produce normal operation of said device, and switching means operated by said first switching means when said first switching means is opened for connecting said second conductor means to said device to heat thereby said device a predetermined amount above the ambient temperature and prevent deposit of moisture on said device.

2. The combination with a polyphase electric motor, of conductor means for supplying a polyphase operating current for said motor, switching means for connecting said conductor means to said motor, a second conductor means for supplying a relatively small heating current for said motor, and switching means operated by said first switching means when said first switching means is opened for connecting said second conductor means to a single circuit only of said motor to heat thereby said motor.

3. The combination with an electric energy translating device, of conductor means for supplying an operating current for said device, a switch for connecting said conductor means to said device, a second conductor means for supplying a relatively small heating current for said device of a value insufficient to produce normal operation of said device, a second switch for connecting said second conductor means to said device, and interlocking means between said switches for closing said second switch when said first switch is opened and for opening said second switch when said first switch is closed, whereby when said device is not in operation it is heated a predetermined amount above the ambient temperature to prevent deposits of moisture on said device.

4. The combination with an electric energy translating device, of conductor means for supplying an operating current for said device, a transformer for supplying a heating current for said device, interlocked electromagnetically operated switching means for connecting said device to said conductor means and for connecting said device to said transformer when said device is disconnected from said conductor means, and an enclosing casing for said transformer and said switching means arranged to be heated by the heat losses in said transformer.

5. The combination with an energy translating device, of conductor means for supplying an operating current for said device, a transformer for supplying a heating current for said device, interlocked electromagnetically operated switching means for connecting said device to said conductor means and for connecting said device to said transformer when said device is disconnected from said conductor means, an enclosing casing for said transformer and said switching means arranged to be heated by the heat losses in said transformer, and auxiliary heating means in said casing connected to said transformer.

6. The combination with an electric motor, of first conductor means for supplying an operating current for said motor, a second conductor means electrically independent of said first conductor means for supplying a lighting circuit voltage to supply a heating current for said motor, a transformer connected to said second conductor means, interlocked electromagnetically operated switching means for connecting said motor to said first conductor means and for connecting said motor to said transformer when said motor is disconnected from said first conductor means, and an enclosing casing for said transformer and said switching means arranged to be heated by the heat losses in said transformer.

7. The combination with an electric energy translating device, of conductor means for supplying an operating current for said device, a switch for connecting said conductor means to said device, a coil for operating said switch, a second conductor means electrically independent of said first conductor means, a relatively low voltage transformer connected to said second conductor means, a second switch for connecting the secondary winding of said transformer to said device to supply heating current to said device, a second coil for operating said second switch, means for selectively energizing said coils, and an enclosing casing for said switches, coils and transformer arranged to be heated by the heat losses in said transformer.

8. The combination with an electric motor, of conductor means for supplying a high voltage operating current for said motor, a switch for connecting said conductor means to said motor, a coil for operating said switch, a second conductor means electrically independent of said first conductor means, a low voltage transformer connected to said second conductor means, a second switch for connecting the secondary winding of said transformer to said motor to supply heating current to said motor, a second coil for operating said second switch, a two-position switch biased to a position to energize said second coil and movable to a position to deenergize said second coil and energize said first coil.

9. The combination with an electric motor of conductor means for supplying a high voltage operating current for said motor, a switch for connecting said conductor means to said motor, a coil for operating said switch, a second conductor means electrically independent of said first conductor means, a low voltage transformer connected to said second conductor means, a second switch for connecting the secondary winding of said transformer to said motor to supply heating current to said motor, a second coil for operating said second switch, a two-position push button biased to a position to energize said second coil and movable to a position to deenergize said second coil and energize said first coil, a third normally closed switch in circuit with said second coil, an operating connection between said first switch and said third switch for holding said third switch open when said first switch is closed, and a fourth switch in circuit with said first coil operated by said second coil to its open position when said second coil is energized, a disconnecting switch for said motor, and an enclosing casing for said switches, said coils and said transformer arranged to be heated by the heat losses in said transformer.

HENRY V. CRAWFORD.